United States Patent

[11] 3,626,015

[72] Inventors Ronald G. Lewis
    Dayton;
    William F. Erman, Springfield Township, both of Ohio
[21] Appl. No. 700,752
[22] Filed Jan. 26, 1968
[45] Patented Dec. 7, 1971
[73] Assignee The Procter & Gamble Company
    Cincinnati, Ohio

[54] NOVEL PHOTOCHEMICAL REACTIONS OF TRANS-α-SANTALATE AND NOVEL COMPOUNDS RESULTING THEREFROM
12 Claims, No Drawings

[52] U.S. Cl.................................................. 260/631.5,
    204/158 R, 252/132, 252/138, 252/522, 260/468 R
[51] Int. Cl....................................................C07c 35/02,
    C11b 9/00, C11d 3/065
[50] Field of Search........................................... 260/631.5,
    617 R, 617 F; 204/158

[56] References Cited
UNITED STATES PATENTS
2,679,476  5/1954   Joffre............................  204/158
2,576,311  11/1951  Schlesinger et al...........  260/617 R
3,468,928  9/1969   Gibson..........................  260/617 F

OTHER REFERENCES

Mousseron-Canet et al., " Bull. Soc. Chem. France," (1961) pp. 1509–1512

Eliel, " Stereochemistry of Carbon Compounds," (1962) pp. 345, 346

Simonsen, " The Terpenes," Vol. III, 2nd ed. (1947) pp. 178–188. Q0416558

Primary Examiner—Bernard Helfin
Assistant Examiner—Joseph E. Evans
Attorneys—Richard C. Witte and Julius P. Filcik ABSTRACT: Ultraviolet irradiation of ethyl trans-α-santalate to obtain, initially, (1) ethyl trans-α-santalate and ethyl cis-α-santalate and, on further irradiation, to obtain the novel compounds, (2) ethyl trans-$\Delta^{11,12}$-α-santalate and ethyl cis-$\Delta^{11,12}$-α-santalate; and the subsequent reduction of these compounds to obtain, with (1), trans-α-santalol and cis-α-santalol and, with (2), novel compounds, trans-$\Delta^{11,12}$-α-santalol and cis-$\Delta^{11,12}$-α-santalol.

NOVEL PHOTOCHEMICAL REACTIONS OF TRANS-α-SANTALATE AND NOVEL COMPOUNDS RESULTING THEREFROM

Field of the Invention

This invention relates to a novel photochemical process for obtaining compounds having valuable sandalwood odors from ethyl trans-α-santalate. More specifically, this invention relates to irradiation with ultraviolet light of ethyl trans-α-santalate or mixtures of the cis and trans isomers of ethyl-α-santalate rich in the trans isomer to obtain, initially, a mixture comprised principally of the trans and cis isomers of ethyl α-santalate enriched in the cis isomer. On further irradiation of this mixture, the novel compounds ethyl trans-$\Delta^{11,12}$-α-santalate and ethyl cis-$\Delta^{11,12}$-α-santalate are formed. The santalates, the trans and cis isomers of ethyl α-santalate and the trans and cis isomers of ethyl $\Delta^{11,12}$-α-santalate, can then be reduced to the corresponding alcohols. Reduction of the ethyl α-santalates results in the formation of the trans and cis isomers of α-santalol while, reduction of the ethyl $\Delta^{11,12}$-α-santalates results in the formation of the novel compounds, the trans and cis isomers of $\Delta^{11,12}$-α-santalol.

PRIOR ART

East Indian sandalwood oil has heretofore been available only from East Indian sandalwood trees. The oil and various individual components of the oil are highly valued perfume bases and used in large quantities throughout the world. The oil, however, is expensive and is in limited and sometimes sporadic supply. For this reason, a continuous effort has been made to synthesize various components of the oil or similar synthetic materials in order to obtain the desirable powerful woody fragrance of sandalwood oil.

cis-α-Santalol, a useful and highly desirable component of sandalwood oil having a desirable sandalwood odor, was recently synthesized by Lewis and Erman, see U.S. Pat. No. 3,478,114, issued Nov. 11, 1969 to Ronald G. Lewis and William F. Erman. By the reprocess described therein, tricycloekasantalal is reacted with a phosphorane to form alkyl α-santalates. In all cases, the resulting alkyl α-santalate is a mixture of cis and trans isomers with a predominate portion of the mixture of isomers consisting of the trans isomer. This mixture is then reduced to obtain a mixture of cis- and trans-α-santalol.

The synthesis of cis-α-santalol is extremely valuable because it provides a constant source of supply of this highly prized perfume component in consistently acceptable quality. One problem, however, still exists with this synthesis. In nearly all cases, more than 70 percent of the final mixture of isomers consists of trans-α-santalol, a compound possessing a bland cedar note. This cedar note masks the desirable sandalwood odor to some degree and renders the final product of the synthesis less valuable as a perfume ingredient. Although the isomers can be separated to obtain the desired cis isomer, the separation process, e.g. by gas chromatography or extraction, is expensive. The cost of this separation poses formidable obstacles to commercial utilization of the desirable, synthetically produced, cis-α-santalol.

SUMMARY OF THE INVENTION

The present invention is an improvement over the synthesis set forth above. For example, the expensive process of separating the α-santalol isomers is eliminated when the irradiation process of this invention is utilized. For this process, a mixture of trans and cis isomers of ethyl α-santalate rich in the trans isomer of the trans isomer per se, intermediates in the process described in the U.S. Pat of Lewis and Erman, supra, is utilized as the starting material. By irradiation with ultraviolet light, the mixture of trans and cis isomers or the trans isomer per se of ethyl α-santalate is readily transformed to a mixture of the trans and cis isomers which is enriched in the cis isomer i.e., a portion of the trans isomer is converted to the cis isomer. The ethyl α-santalate isomers are then reduced to the corresponding trans and cis isomers of α-santalol. With the increase in the amount of cis isomer in the mixture, the powerful sandalwood odor (designated as mild, sweet, woody odor) of cis-α-santalol dominates the bland cedar note of trans-α-santalol; therefore, no further separation of the isomers is required.

As an added benefit, it has been found that the trans and cis isomers of ethyl α-santalate can be converted, by prolonged irradiation, to the trans and cis isomers of ethyl $\Delta^{11,12}$-α-santalate. The trans and cis isomers of ethyl $\Delta^{11,12}$-α-santalate are easily reduced to the trans and cis isomers of $\Delta^{11,12}$-α-santalol both of which have a distinct, powerful, sandalwood odor (designated as mild, creamy, woody odor).

The process of this invention having the above advantages, as well as other advantages which will become apparent from reading the specification, comprises the steps of:

1. subjecting to ultraviolet irradiation ethyl trans α-santalate having the structural formula

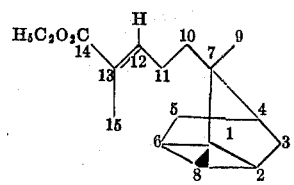

or mixtures rich in the trans isomer, comprising ethyl trans-α-santalate and ethyl cis-α-santalate, the cis isomer having the structural formula

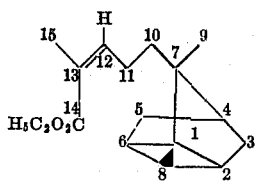

to obtain mixtures comprising ethyl trans-α-santalate and ethyl cis-α-santalate which are enriched in the cis isomer;

2. continuing the irradiation to convert the mixture of trans and cis isomers of ethyl α-santalate or portions thereof to the novel compounds, ethyl trans-$\Delta^{11,12}$-α-santalate having the structural formula

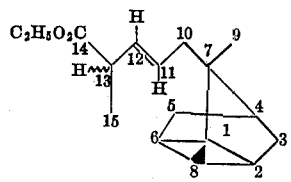

and ethyl cis-$\Delta^{11,12}$-α-santalate having the structural formula

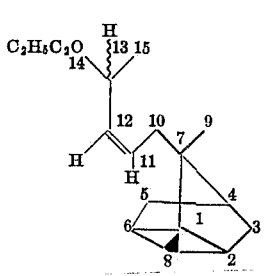

THis invention also comprises the first step alone, i.e., the conversion of a mixture of trans and cis isomers of ethyl α-santalate rich in the trans isomer or the trans isomer per se to mixtures of the trans and cis isomers of ethyl α-santalate enriched in the cis isomer. Additionally, the invention comprises the step of reducing the novel compounds, the trans and cis isomers of ethyl $\Delta^{11,12}$-α-santalate, to the novel compounds, the trans and cis isomers of $\Delta^{11,12}$-α-santalol. The novel compounds, the cis and trans isomers of ethyl $\Delta^{11,12}$-α-santalate and the cis and trans isomers of $\Delta^{11,12}$-α-santalol, are also an integral portion of the invention described herein. The trans and cis isomers of ethyl $\Delta^{11,12}$-α-santalate have specific utility as intermediates in the formation of the trans and cis isomers of $\Delta^{11,12}$-α-santalol while the isomers of $\Delta^{11,12}$-α-santalol have specific utility in the perfume arts.

DESCRIPTION OF THE PRODUCTS AND PROCESS

In the novel photochemical reaction of this invention, the starting material can be comprised entirely of ethyl trans-α-santalate or can be comprised of a mixture of ethyl cis-α-santalate rich in the trans isomer. When mixtures of the cis and trans isomers are utilized herein, the process is most valuable when the trans isomer comprises in excess of about 60 percent of the initial material. However, mixtures of the cis and trans isomers are enriched in the cis isomer by ultraviolet irradiation until a weight ratio of trans isomer to cis isomer of about 3:4 is obtained. Accordingly, mixtures of cis and trans isomers of ethyl α-santalate wherein the trans isomer is present in amounts greater than the weight ratio of trans isomer to cis isomer of about 3:4 can be utilized herein.

The cis isomer of ethyl α-santalate or mixtures of the cis and trans isomers of ethyl α-santalate rich in the cis isomer can also be irradiated. However, irradiation converts the cis isomer to the trans isomer until a weight ratio of trans isomer to cis isomer of about 3:4 is obtained. The conversion of the valuable cis isomer to the much less valuable trans isomer is not desired. Conversion of the mixture of cis and trans isomers of ethyl α-santalate in a weight ratio of trans isomer to cis isomer of about 3:4 to the cis and trans isomers of ethyl $\Delta^{11,12}$-α-santalate is a valuable process. However, this mixture of isomers is more easily and less expensively obtained by irradiating ethyl trans-α-santalate or mixtures of ethyl cis- and ethyl trans-α-santalate rich in the trans isomer.

The trans isomer of ethyl α-santalate or mixtures of the trans and cis isomers of ethyl α-santalate rich in the trans isomer can be obtained by the process described in the U.S. patent of Lewis and Erman, supra. (This disclosure is incorporated by reference herein.) Alkyl α-santalates are formed by this process by allowing tricycloekasantalal to react with a phosphorane.

When carrying out the irradiation of ethyl trans-α-santalate or mixtures of the cis and trans isomers of ethyl α-santalate, any convenient source of ultraviolet radiation can be used, i.e., a light source that emits photoenergy at wavelengths distributed throughout the range of from about 180 $\mu$ to about 400 $\mu$. It is preferred that the light source emit photoenergy at wavelengths primarily in the range of from about 180 $\mu$ to about 290 $\mu$.

Commercially available high-pressure mercury arc lamps, i.e., lamps having a total power capacity ranging from about 50 watts to about 1,000 watts, preferably from about 100 watts to about 600 watts, have the above described spectral characteristics and are particularly useful sources of ultraviolet radiation for use herein. Also useful in this invention are the commercially available low-pressure mercury lamps. These lamps have a total power capacity ranging from about 0.5 watts to about 50 watts. These low-pressure mercury lamps show principal emission in the region of 253.7 $\mu$.

The reaction vessels used in he irradiation of the isomers of ethyl α-santalate are not particularly critical. Quartz, Vycor or Corex reaction vessels can be used herein. When it is desired to obtain the novel ethyl $\Delta^{11,12}$-α-santalates by irradiation, Pyrex reaction vessels should not be used as Pyrex filters out most light of wavelengths of less than 290 $\mu$ and significantly increases the reaction time required to obtain these compounds. Quartz and Vycor reaction vessels are generally preferred for use in this photochemical reaction.

Preferably, a solvent is used as a medium for the irradiation reaction. This process proceeds in the presence or in the absence of a photosensitizer. Use of a photosensitizer, i.e. benzene, toluene, does not effectively change the products of the reaction. Any solvents are suitable for use herein which dissolve the starting material, i.e. ethyl trans-α-santalate or mixtures of the trans and cis isomers of ethyl α-santalate, and the products of that irradiation to form a homogeneous system but which are otherwise inert and do not substantially interfere with the transmission of the radiation.

Saturated hydrocarbons constitute a class of preferred solvents. Examples of such saturated hydrocarbon solvents include the alkanes, preferably of from 5 to 12 carbon atoms, such as hexane, octane, dodecane and the like; and the cyclic alkanes, preferably of from about five to 10 carbon atoms such as cyclopentane, cyclohexane, cyclooctane and the like. Hexane and cyclohexane represent especially preferred saturated hydrocarbon solvents.

Another particularly preferred class of solvents for use in this invention is the aromatic hydrocarbons containing from about six to about 18 carbon atoms such as benzene, toluene and xylene.

Ethers constitute another class of preferred solvents for use in this photochemical reaction. Examples of suitable ether solvents include cyclic monooxy ethers, such as tetrahydrofuran, cyclic dioxy ethers such as dioxane, aliphatic monooxy ethers such as diethyl ether and aliphatic dioxy ethers such as ethylene glycol dimethyl ether or diethylene glycol dimethyl ether. All of the ether solvents preferably contain from about four to about 10 carbon atoms.

Alcohols constitute another class of solvents suitable for use in this invention. Examples of suitable alcohol solvents include aliphatic monohydric alcohols containing from about one to about 10 carbon atoms such as methanol, ethanol, t-butyl alcohol, and the like, and aliphatic dihydric alcohols containing from about two to about 10 carbon atoms, such as ethylene glycol or propylene glycol. T-Butyl alcohol represents an especially preferred alcohol solvent.

The above solvents can be utilized separately in this invention or they can be used in admixture in any proportions.

Preferably the concentration of the ethyl α-santalate starting composition in the reaction medium i.e., the solvent, ranges from about 0.001 M to abut 2 M more preferably from abut 0.01 M to about 0.5 M.

It is preferable to carry out the irradiation reaction in an inert atmosphere such as nitrogen, argon etc., To prevent quenching, oxidation, contamination and the like. To insure the uniform irradiation of the starting material, it is also preferable to agitate the reactants. This can easily be accomplished by bubbling the inert gas through the reaction medium during irradiation.

The irradiation reaction is primarily photochemical rather than thermal in nature; thus the temperature employed can vary widely, e.g., from about −40° to about 100° C. A preferred temperature range for the reaction is from about 20° to about 35° C. Because of the energy loss in the form of heat from the mercury lamps, some sort of cooling device, e.g., a water bath, is generally utilized to maintain the temperature of the reaction components in the desired temperature range.

If a mixture of ethyl trans-α-santalate and ethyl cis-α-santalate relatively free of trans and cis isomers of ethyl $\Delta^{11,12}$-α-santalate is desired which, when reduced, possesses a desirable sandalwood odor, the photochemical reaction should be stopped when a weight ratio of 6 parts of the trans isomer to 5 parts of the cis isomer is obtained. This ratio of trans isomer to cis isomer is the maximum amount of the cis isomer obtainable by irradiation techniques if a minimum amount, i.e., less than about 5 percent of ethyl $\Delta^{11,12}$-α-santalates are desired.

The trans and cis isomers can be separated by chromatographic means or extraction in accordance with the methods outlined in the U.S. Patent of Lewis and Erman, supra. If the mixture of isomers in the weight ratio of 6:5, above described, is reduced in accordance with the teachings of the above Patent, the bland cedar note of the trans isomer is effectively masked by the powerful sandalwood odor of the cis isomer. Thus, this process is extremely advantageous because the expensive separation techniques are not required to obtain the powerful sandalwood fragrance.

If a mixture of the novel compounds, the cis and trans isomers of ethyl $\Delta^{11,12}$-$\alpha$-santalate, or mixtures of the cis and trans isomers of ethyl $\Delta^{11,12}$ $\alpha$-santalate and the cis and trans isomers of ethyl $\alpha$-santalate are desired, the mixture of cis and trans isomers of ethyl $\alpha$-santalate should be further irradiated after the above described weight ratio of 6:5 is obtained.

When mixtures of the cis and trans isomers of ethyl $\alpha$-santalate are irradiated, the above described mixture of 6 parts of the trans isomer and 5 parts of the cis isomer is first obtained. As irradiation is continued, a portion of the ethyl $\alpha$-santalate is deconjugated to ethyl $\Delta^{11,12}$$\alpha$-santalate and the ratio of trans isomer to cis isomer of ethyl $\alpha$-santalate changes until a weight ratio of 3 parts of the trans isomer to 4 parts of the cis isomer is obtained. This weight ratio of trans to cis isomers of ethyl $\alpha$-santalate remains constant throughout the rest of the irradiation process until primarily ethyl $\Delta^{11,12}$-$\alpha$-santalate is obtained, i.e., in excess of 95 percent by weight of the cis and trans isomers of ethyl $\Delta^{11,12}$-$\alpha$-santalate.

The trans isomer of ethyl $\Delta^{11,12}$-$\alpha$-santalate has the following structural formula

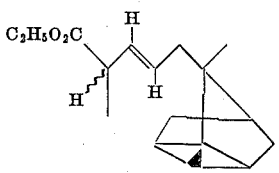

while the cis isomer of ethyl $\Delta^{11,12}$-$\alpha$-santalate has the following structural formula

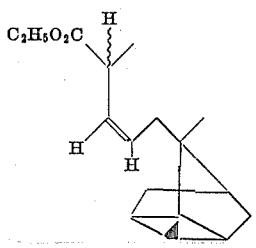

There are four possible diasteriomeric forms of ethyl $\Delta^{11,12}$-$\alpha$-santalate. Since both the cis and trans olefinic isomers of each of these diasteriomers are formed eight isomers of di-ethyl $\Delta^{11,12}$-$\alpha$-santalate are possible. All eight of the isomers can be prepared by the process described herein. Optical isomerization of ethyl $\Delta^{11,12}$-$\alpha$-santalate, however, does not affect odor characteristics and, therefore, will not be considered at length herein.

Mixtures of the trans and cis isomers of ethyl $\alpha$-santalate and the trans and cis isomers of ethyl $\Delta^{11,12}$-$\alpha$-santalate, as hereinbefore described, can be obtained by stopping the photochemical reaction before all of the ethyl $\alpha$-santalates have been deconjugated to the ethyl $\Delta^{11,12}$-$\alpha$-santalates. A specific isomer can be obtained from the reaction mixture by separating the isomers by techniques hereinbefore described.

The irradiation time required for the above described photochemical reaction varies with concentrations of the starting materials, concentration of the solvent, the particular solvent utilized, the intensity of the radiation source, the physical reaction conditions, the absorption of the irradiation by the reaction vessel, and the products desired. However, the course of the reaction can, as before mentioned, be readily followed by gas chromatography. Therefore, the reaction can be stopped at will to obtain the desired products.

The solvent and the product of the irradiation, i.e. either a mixture of ethyl trans-$\alpha$-santalate and ethyl cis-$\alpha$-santalate, or a mixture of ethyl trans-$\Delta^{11,12}$-$\alpha$-santalate and ethyl cis-$\Delta^{11,12}$-$\alpha$-santalate, or combinations of these mixtures, can readily be separated from the reaction mixture by conventional techniques, e.g., distillation.

The above described mixtures can be reduced with conventional reducing agents. When the mixture of ethyl trans-$\alpha$-santalate and ethyl cis-$\alpha$-santalate is reduced, a mixture of trans-$\alpha$-santalol and cis-$\alpha$santalol is obtained. The cis isomer has a strong, particularly valuable sandalwood odor, while the trans isomer has a bland, cedar note. The cedar note is effectively masked by the sandalwood odor when these isomers are present in the hereinbefore defined weight ratio of 6:5; therefore no separation of these isomers is required.

When the mixture of isomers of ethyl $\Delta^{11,12}$-$\alpha$-santalates is reduced, a mixture of trans-$\Delta^{11,12}$-$\alpha$-santalol and cis-$\Delta^{11,12}$-$\alpha$-santalol is obtained. Both of these isomers have valuable sandalwood odors, i.e., mild, creamy, woody odors, and are, therefore, useful as perfume components. There are eight isomers of dh-$\Delta^{11,12}$-$\alpha$-santalol (see above discussion with regard to the isomers of ethyl $\Delta^{11,12}$-$\alpha$-santalate). Optical isomerization, however, does not effect the odor characteristics of $\Delta^{11,12}$-$\alpha$-santalol and will not be extensively treated herein.

Mixtures of the cis and trans isomers of ethyl $\alpha$-santalate and the cis and trans isomers of ethyl $\Delta$-$^{11,12}$-$\alpha$-santalate can be easily reduced. Mixtures of the corresponding isomers of $\alpha$-santalol and $\Delta^{11,12}$-$\alpha$-santalol are obtained.

Satisfactory reducing agents for this reducing step are lithium aluminum hydride, lithium aluminum hydride, lithium borohydride, aluminum hydride, lithium trimethoxy alumino hydride and sodium borohydride-aluminum trichloride. Lithium aluminum hydride is the preferred reducing agent.

Preferably this reduction reaction is performed in an ether solvent, preferably an ether containing from four to 10 carbon atoms, such as diethyl ether, a cyclic monooxy ether such as tetrahydrofuran, a cyclic dioxy ether such as dioxane, or an aliphatic dioxy ether such as methylene glycol, dimethyl ether or diethylene glycol dimethyl ether. Tetrahydrofuran and diethyl ether are highly preferred solvents for this reaction.

The concentration of the component being reduced in the solvent generally ranges from about 2 percent to about 4 percent by weight of the solvent and the concentration of the reducing agent ranges from about 0.05 to about 1 percent by weight of the solvent. These concentrations insure desired homogeneity in the system. The temperature of the reduction reaction is preferably maintained below about 30° C. to avoid the formation of hydrogenolysis products and to avoid olefin reduction of the unsaturated compounds involved in the reaction. More preferably the temperature is maintained within the range of from about 15° to about 25° C. It is also desirable to carry out the reduction reaction in the presence of an inert gas such as nitrogen or argon.

The cis isomer of $\alpha$-santalol and the trans and cis isomers of $\Delta^{11,12}$-$\alpha$-santalols prepared by the photochemical reaction of this invention all have highly desirable and useful odors. These odors are generally characterized as powerful sandalwood odors. More specifically, the odor of cis-$\alpha$-santalol is characterized as a mild, sweet, woody odor while the odor of the cis and trans isomers of $\Delta^{11,12}$-$\alpha$-santalol are characterized as mild, creamy, woody odors.

These components can be used individually or in admixture with each other as odorants per se or as components of perfume compositions for ultimate use in products such as soaps, detergents, deodorants and the like. Perfume compositions containing odoriferously effective amounts, e.g., 0.0001 percent to about 50 percent of any of the above described perfume components are desirable and useful. More specific illustrations of the perfume utility of these compounds are found in the examples.

EXAMPLES

General Procedure

The following examples illustrate specific preferred embodiments of this invention and are not intended to be limiting. All percentage and ratios in the following examples, as well as in the specification and in the appended claims, are by weight unless otherwise indicated. Temperatures are expressed in degrees centigrade.

Data listed in all of the examples were obtained by means of the following techniques unless otherwise indicated. Melting points were determined on a Kofler micro hot stage and are corrected. Boiling points were observed on standard thermometers and are uncorrected. Infrared spectra were recorded on a Perkin-Elmer Infracord spectrophotometer Nuclear magnetic resonance (n.m.r.) spectra were determined in deuterated chloroform solution or carbon disulfide solution with a Varian model Ha–100 or a Varian Model A–6 spectrometer, using tetramethylsilane as an internal reference. The n.m.r. data are noted by multiplicity (S = singlet, d = doublet, t = triplet, q = quartet and m = unresolved multiplet), integration, coupling constant (in cps), and assignment. Gas-liquid chromatograms were obtained on an Aerograph model 200 or 202B instrument using two columns: (1) a 5 ft. by 0.25 in. column packed with 20 percent FFAP (commercial polyester packing obtained from Varian Aerograph) on 60–80 mesh acid washed chromosorb P.D.M.S.C. (a commercial support from Varian-aerograph) and (2) to a 10 ft. by 0.25 in. column packed with 20 percent Reoplex–400 (commercial polyester packing obtained from Varian-Aerograph) on 60–80 )mesh chromosorb W.D.M.C.S. (a commercial siliconized support from Varian-Aerograph). The helium flow rate in these columns was maintained at 100 ml./min. unless otherwise noted.

All irradiations, unless otherwise indicated, were perfomed in a conventional photochemical reaction flask equipped with a nitrogen flush and either a quartz or Vycor immersion well. Nitrogen was bubbled through the reaction mixtures and the temperature was maintained in the range of 20° to 35° C. by means of a water jacket.

The light sources used in the following examples were commercially available mercury lamps. More specific data on the lamps used are tabulated as follows:

|  | Radiation source | |
| --- | --- | --- |
|  | Hanovia L–679A[1] (high pressure) | Rayonet RPR–2537A[2] (low pressure) |
| Total power capacity (watts) | 450 | [3] 35 |
| Ultraviolet spectral characteristics (watts): | | |
| 200 m$\mu$–250 m$\mu$ | 14.0 | [3] 35 |
| 250 m$\mu$–300 m$\mu$ | 21.3 | [3] 35 |
| 300 m$\mu$–400 m$\mu$ | 48.4 | [3] 35 |
| Total radiated energy | 175.8 | [3] 35 |

[1] Obtained from Hanovia Lamp Division, Englehard Industries. For further details, see specification sheet EH–223, 5-1-59, Englehard Industries.
[2] A circular array of 16 lamps as obtained from Southern New England Untraviolet Company. For further details see catalog No. RPR–100, Southern New England Ultraviolet Company.
[3] With principal emission at 253.7 m$\mu$.

EXAMPLE I

Irradiation of Ethyl $\alpha$-Santalates Using a Pyrex Filter

A solution of 860 mg. ($3.27 \times 10^{-3}$ moles) of a mixture comprised of 5 parts by weight of ethyl trans-$\alpha$-santalate and 1 part by weight of ethyl cis-$\alpha$-santalate in 130 ml. of toluene was degassed with a steady stream of nitrogen for a period of 1 hour in a Vycor vessel fitted with a Pyrex filter. The ethyl-$\alpha$-santalates were prepared by the method described in the patent of Lewis and Erman, supra, see example II at page 18.

This solution was subjected to ultraviolet light which was generated from a 450–watt Hanovia mercury arc lamp and passed through the Pyrex filter. After 41 hours of continuous irradiation, the ratio of trans to cis isomers of ethlyl $\alpha$-santalate was 6:5 according to gas-liquid chromatographic analysis. Removal of the toluene under reduced pressure left an oily residue which, on short-path distillation, afforded 837 mg. of a clear oil, b.p. 128–135° (0.6mm). The distillate was comprised of a mixture of ethyl trans-$\alpha$-santalate, ethyl cis-$\alpha$-santalate, and ethyl $\Delta^{11,12}$-$\alpha$-santalate in a weight ratio of 58:39:3 as determined by gas-liquid chromatographic analysis. The analyses were performed using the instruments and columns described in the general procedure and employing a column temperature of 208° and a helium flow rate of 60 ml./min. Separation and collection of the trans and cis isomers of ethyl-$\alpha$-santalate by gas-liquid chromatography afforded clear oils whose spectral properties were identical to those described in example I in the U.S. Pat of Lewis and Erman, supra, at page 15, lines 23–24 and page 16, lines 1–13. This description of spectral properties of the trans and cis isomers of ethyl-$\alpha$-santalate is specifically incorporated herein by reference

EXAMPLE II

Irradiation of Ethyl-$\alpha$-Santalates Using a Vycor Filter and Cyclohexane Solvent A solution of 200 mg. ($7.6 \times 10^{-4}$ moles) of mixture of 97 parts by weight of ethyl trans-$\alpha$-santalate and 3 parts by weight of ethyl cis-$\alpha$-santalate in 150 ml. of spectroscopically pure cyclohexane was degassed for a period of 1 hour and irradiated with ultraviolet light which was generated from a 450-watt Hanovia mercury arc lamp. Aliquots were removed at specified intervals and analyzed by gas-liquid chromatography. The quantity of aliquot removed the irradiation period, and the weight percent of each compound in the mixture of compounds in each aliquot is listed in the table below.

| Period of irradiation, minutes | Volume of aliquot, ml. | Weight percent of compounds in mixture | | |
| --- | --- | --- | --- | --- |
|  |  | Ethyl trans-$\alpha$-santalate | Ethyl cis-$\alpha$-santalate | Ethyl $\Delta^{11,12}$-$\alpha$-santalate |
| 2.5 | 3.0 | 55 | 42 | 3 |
| 5 | 3.0 | 44 | 43 | 13 |
| 10 | 3.0 | 29 | 40 | 37 |
| 20 | 4.0 | 15 | 19 | 66 |
| 30 | 5.0 | 5 | 8 | 87 |

The gas-liquid chromatography retention time and spectral parameters of ethyl trans-$\alpha$-santalate and ethyl cis-$\alpha$-santalate were identical to the retention time and spectral parameters described for these compounds in example I, above and the gas chromatography retention time and spectral parameters of ethyl $\Delta^{11,12}$-$\alpha$-santalate were identical to the retention time and spectral parameters described for this compound in example IV below.

EXAMPLE III

Irradiation of Ethyl $\alpha$-santalates Using a Vycor Filter and Ethanol Solvent A solution of 100 mg. ($3.9 \times 10^{-3}$ moles) of a mixture comprised of 97 parts by weight of ethyl trans-$\alpha$-santalate and 3 parts by weight of ethyl cis-$\alpha$-santalate in 150 ml. of absolute alcohol was degassed for a period of 1 hour and irradiated with ultraviolet light which was generated from a 450-watt Hanovia mercury arc lamp. Aliquots were removed at specified intervals and analyzed by gas-liquid chromatography. The quantity of aliquot removed, the irradiation period, and the weight percent of each compound in the mixture of compounds in each aliquot is listed in the table below.

| Period of irradiation, minutes | Volume of aliquot, ml. | Weight percent of compounds in mixture | | |
|---|---|---|---|---|
| | | Ethyl trans-α-santalate | Ethyl cis-α-santalate | Ethyl $\Delta^{11,12}$-α-santalate |
| 5 | 5.0 | 48 | 36 | 16 |
| 10 | 5.0 | 25 | 36 | 39 |

The gas chromatography retention time and spectral parameters of ethyl trans-α-santalate and ethyl cis-α-santalate were identical to the retention time and spectral parameters described for these compounds in example I, above and the gas chromatography retention time and spectral parameters of ethyl $\Delta^{11,12}$-α-santalate were identical to the retention time and spectral parameters described for this compound in example IV below.

EXAMPLE IV

Preparation of Ethyl $\Delta^{11,12}$-α-Santalates by Irradiation of Ethyl α-Santalates Using a Vycor Filter and Toluene as Solvent A solution of 1.65 g. (6.3×10⁻³ moles) of a mixture comprised of 85 parts by weight of ethyl trans-α-santalate and 15 parts by weight of ethyl cis-α-santalate in 130 ml. of toluene was degassed and irradiated for a period of 6 hours with ultraviolet light which was generated from a 450-watt Hanovia mercury arc lamp. Evaporation of solvent under reduced pressure and distillation of the residual oil afforded 1.02 g. (62 percent yield) of oil b.p. 120–13°/1.5 mm. comprised of ethyl trans-α-santalate (3 percent) ethyl cis-α-santalate (4 percent) and the ethyl $\Delta^{11,12}$-α-santalates (93 percent). Collection of the $\alpha^{11,12}$-α-santalate peak by preparation gas chromatography on the 5 ft. = 0.25 in FFAP column afforded a mixture of ethyl cis- and ethyl trans-$\Delta^{11,12}$-α-santalates as an oil having the following characteristics: $[\alpha]_D^{25}$ 2.8; infrared spectrum; $\lambda_{max}^{neat}$ 3.28 (Sh.), 3.39, 3.44 (Sh.) 5.77, 6.93, 7.36, 8.53 μ; n.m.n. spectrum: $\tau CDCL_3$ 8.79 (3H, t, $J = 7.2$ c.p.s.), 8.76 (3H, d, $J_{12,14} = 7.2$ c.p.s.), 8.18 (2H, t, $J = 5.6$ c.p.s.), 4.57$^{10,11}$ (2H, s, broad with fine coupling).

Analysis calculated for $C_{17}H_{26}O_2$; C, 77.8; H, 10.0. Found: C, 77.92; H, 10.03.

EXAMPLE V

Preparation of $\Delta^{11,12}$-α-Santalols from $\Delta^{11,12}$-α-Santalates

A solution of 417 mg. (1.6×10⁻³ moles) of ethyl $\Delta^{11,12}$-α-santalates in 10 ml. of dry ether was added dropwise to a rapidly stirred suspension of 171 mg. of lithium aluminum hydride in 5 ml. of dry ether maintained at 0°–5°. This suspension was stirred under a nitrogen atmosphere at ice-bath temperature (0°–5°) for 15 minutes followed by stirring at room temperature for 1 hour. The excess lithium aluminum hydride was destroyed with sodium sulfate decahydate and the ether was decanted through anhydrous sodium sulfate. Removal of the ether under reduced pressure and short-path distillation of the residual oil afforded 353 mg. (100 percent yield) of a clear oil, b.p. 107° (0.25 mm). Gas-liquid chromatographic analysis of the distillate showed the presence of one major peak $\alpha^{11,12}$-α-santalol (75 percent) and a number of unidentified components (25 percent). Collection of the major component by preparative gas chromatography (218° , $R_t$420 sec.) gave $\Delta^{11,12}$-α-santalol having the following characteristics: $[\alpha]_D^{25}$ +10.5°; infrared spectrum: $\lambda_{max}^{CCl_4}$ 3.00, 3.50 6.92, 7.34, 9.69 μ; n.m.r. spectrum: $\tau CDCl_3$ 8.10 (2H, m), 7.70 (1H, m). 8.61 (2H, ABX octet), 4.68 (2H, m).

Analysis calculated for $C_{15}H_{24}O$; C, 81.8; H, 11.1. Found: c, 81.8; H, 11.1.

The mixtures of trans and cis isomers of $\Delta^{11,12}$-α-santalate had an odor characterized as a mild creamy woody odor.

EXAMPLE VI

Results substantially similar to those achieved in examples I through IV are obtained in that the starting materials are uniformly irradiated when the following solvents are substituted for the solvents used therein: hexane, octane, dodecane, cyclopentane, cyclohexane, cyclooctane, benzene, toluene, xylene, tetrahydrofuran, dioxane, diethyl ether, ethylene glycol dimethyl ether, methanol, ethanol, ti-butyl alcohol, ethylene glycol, propylene glycol.

Results substantially similar to those achieved in example V are obtained in that the trans and cis isomers of ethyl $\Delta^{11,12}$-α-santalol when the following reducing agents are substituted for lithium aluminum hydride: lithium borohydride aluminum hydirde, lithium trimethoxy alumino hydride, and sodium borohydride-aluminum trichloride.

Results substantially similar to those achieved in example V are obtained, as described above, when the following ether solvents are substituted for diethyl ether: tetrahydrofuran, dioxane, methylene glycol, dimethyl ether, and diethylene glycol dimethyl ether.

EXAMPLE VII

Perfume Compositions

Perfume compositions are prepared by intermixing the components shown below. These compositions all exhibit highly desirable and useful odors Composition A—Rose de Chine Fragrance

| Component | % by weight |
|---|---|
| Geranium Bourbon | 20 |
| Geraniol | 30 |
| Rose Otto Synthetic | 4 |
| Mixture of cis and trans isomers of $\Delta^{11,12}$-α-santalol[1] | 3 |
| Patchouli | 8 |
| Cedarwood | 8 |
| Musk Xylol | 6 |
| Terpineol | 15 |
| Phenyl Ethyl Alcohol | 6 |
| TOTAL | 100 |

[1] This mixture of isomers is obtained from the process of example V and has a mild, creamy, woody odor Composition B—Chypre Fragrance

| Component | % by weight |
|---|---|
| Oakmoss | 2.0 |
| Copaiba Balsam | 3.0 |
| Mixture of cis and trans isomers of $\Delta^{11,12}$-α-santalol[1] | 3.0 |
| Coumarin | 3.0 |
| Cedarwood | 6.0 |
| Peru Balsam | 3.0 |
| Terpineol | 55.0 |
| Musk Xylol | 3.0 |
| Patchouli | 1.5 |
| Vetivert | 1.5 |
| Bergamot | 7.0 |
| Musk Ambrette | 6.0 |
| Benzoin Resin | 6.0 |
| TOTAL | 100.0 |

[1] This mixture of isomers is obtained from the process of example V and has a mild, creamy, woody odor.

Composition C—Sandal Fragrance

| Component | % by weight |
| --- | --- |
| Mixture of trans and cis isomers of α-santalol in a weight ratio of trans to cis isomers of about 6:5 | 40.0 |
| Geranium Bourbon | 15.0 |
| Vetivert | 3.0 |
| Patchouli | 1.0 |
| Olibanum | 1.0 |
| Coumarin | 2.5 |
| Citronellol | 15.0 |
| Phenyl Ethyl Alcohol | 7.5 |
| Musk Xylol | 0.6 |
| Musk Ambrette | 0.4 |
| Peru Balsam | 4.0 |
| Ambre Synthetic | 3.5 |
| Cassia | 1.0 |
| Cinnamic Alcohol | 0.5 |
| Jasmine Synthetic | 1.5 |
| Ionone | 3.5 |
| TOTAL | 100.0 |

[1]This mixture of isomers has a mild, sweet, woody odor.

Composition D—Fougere Fragrance

| Component | % by weight |
| --- | --- |
| Lavender Oil | 10 |
| Lavandin | 10 |
| Geranium Bourbon | 8 |
| Oakmoss | 4 |
| Coumarin | 6 |
| Patchouli | 3 |
| Cedarwood | 10 |
| Mixtures of trans and cis isomers of α-santalol in a weight ratio of trans to cis isomers of about 6:5[1] | 12 |
| Methyl Salicylate | 1 |
| Terpinyl Acetate | 12 |
| Amyl Salicylate | 9 |
| Geraniol | 10 |
| Musk Xylol | 5 |
| TOTAL | 100 |

[1]This mixture of isomers has a mild, sweet, woody odor.

Mixtures of cis-α-santalol and trans-α-santalol in a weight ratio of trans isomer to cis isomer of 6:5 or mixtures of these isomers containing less of the trans isomer, cis-$\Delta^{11,12}$-α-santalol, trans-$\Delta^{11,12}$-α-santalol and various mixtures of these components are useful in various perfume compositions. Thus, the components and proportions in the perfume compositions of this example can be adjusted according to methods well know in the perfume art to form a wide variety of desirable perfume compositions containing odoriferously effective amounts of these compounds.

EXAMPLE VIII

Detergent Compositions

A conventional, granular, heavy-duty built detergent having the following composition is prepared

| Component | % by Weight |
| --- | --- |
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume Composition A of Example VII | 0.2 |
| TOTAL | 100.0 |

The detergent composition exhibits a highly desirable Rose de Chine fragrance. Composition B, composition C, or composition D of example VII can be substituted for composition A in the above heavy duty, built detergent. Composition B imparts a Chypre fragrance to the detergent; composition C imparts a Sandal fragrance; and composition D imparts a Fourgere fragrance.

EXAMPLE IX

Soap Bar Composition

A conventional household soap bar having the following composition is prepared:

| Component | % by Weight |
| --- | --- |
| Sodium soap | 75.0 |
| Potassium soap | 7.5 |
| (The total soap comprises a mixture of 80% tallow soap and 20% coconut soap.) | |
| Water | 15.0 |
| Perfume composition A of example VII | 2.5 |

This soap bar exhibits a highly desirable Rose de Chine fragrance. Composition B composition C, or composition D can be substituted for composition A in the above soap bar composition. Composition B imparts a Chypre fragrance to the soap bar; composition C imparts a Sandal fragrance; and composition D imparts a Fourgere fragrance

What is claimed is:

1. cis-$\Delta^{11,12}$-α-Santalol having the formula

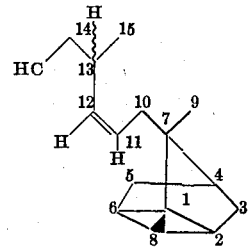

2. trans-$\Delta^{11,12}$-α-Santalol having the formula

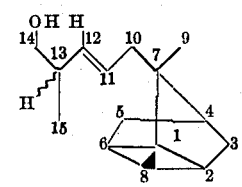

3. A mixture of cis-$\Delta^{11,12}$-α-Santalol and trans-$\Delta^{11,12}$-α-Santalol.

4. A novel photochemical process for producing a mixture of trans-$\alpha^{11,12}$-α-Santalol having the structural formula

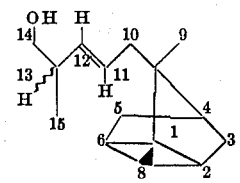

and ethyl cis-$\Delta^{11,12}$-α-Santalol having the structural formula

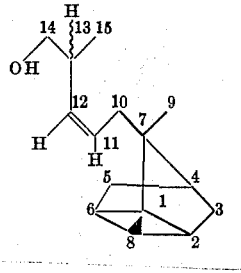

comprising the steps of:
a. subjecting to ultraviolet irradiation ethyl trans-α-santalate having the structural formula

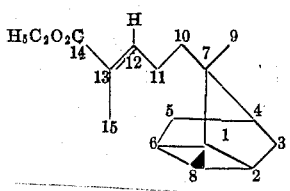

or mixtures, rich in the trans isomer, comprising ethyl trans-α-santalate and ethyl cis-α-santalate, the cis isomer hang the structural formula

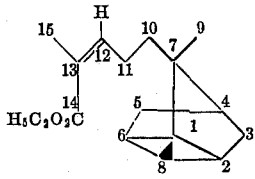

to obtain mixtures comprising ethyl trans-$\Delta^{11,12}$-α-santalate having the structural formula

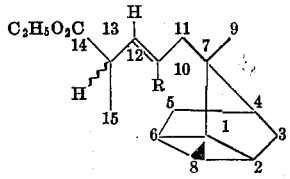

and ethyl cis-$\Delta^{11,12}$-α-santalate having the structural formula

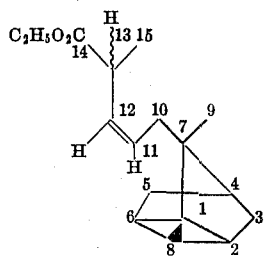

and b. reducing the cis and trans isomers of $\Delta^{11,12}$-α-santalate to the cis and trans isomers of $\Delta^{11,12}$-α-Santalol.

5. THe process of claim 4 wherein the reduction reaction of step (b) is performed in an ether solvent and wherein the ehtyl$\Delta^{11,12}$-α-santalate comprises from about 2 percent to about 4 percent by weight of the solvent and the reducing agent comprises from about 0.05 the solvent percent to about 1 percent by weight of the solvent.

6. The process of claim 5 wherein in step (b) the reduction reaction is performed at temperatures below about 30° C. and in an inert atmosphere.

7. The process of claim 5 wherein step (a) the irradiation reaction is carried out in an inert atmosphere, a solvent is utilized as an irradiation reaction medium, and the concentration of ethyl α-santalate isomers in the reaction medium ranges form abut 0.001 M to about 2M.

8. The process of claim 7 wherein in step (a) a mixture of cis and trans isomers of ethyl α-santalate is used, and said trans isomer is present in amounts greater than weight ratio of trans isomer to cis isomer of 3:4.

9. The process of claim 8 wherein in step (a) the trans isomer comprises in excess of about 60 percent of the mixture of cis and trans ethyl α-santalate.

10. The process of claim 5 wherein in step (a) the wavelengths of irradiation are distributed throughout the range of abut 180 mμ to about 400 mμ.

11. The process of claim 10 wherein step (a) the wavelengths of irradiation are distributed throughout the range of about 180 mμ to 290 mμ.

12. The process of claim 10 wherein in step (a) the irradiation reaction is carried out in an inert atmosphere and wherein a solvent is utilized as an irradiation reaction medium and the concentration of ethyl α-santalate isomers in the reaction medium ranges form abut 0.001 M to about 2 M.

* * * * *

PO-1050
(5/69)

UNITED STATES PATENT OFFICE
CERTIFICATE OF CORRECTION

Patent No. 3,626,015                     Dated   December 7, 1971

Inventor(s)   Ronald G. Lewis and William F. Erman

It is certified that error appears in the above-identified patent and that said Letters Patent are hereby corrected as shown below:

Column 1, line 39, delete "reprocess" and insert therefor --- process ---. Column 3, line 22, after "ethyl" and before "cis" insert therefor --- trans-α-santalate and ethyl ---; line 58, delete "$\mu$" and insert therefor --- m$\mu$ ---; line 59, delete "$\mu$" and insert therefor --- m$\mu$ ---; line 60, delete "$\mu$" and insert therefor --- m$\mu$ ---; line 61, delete "$\mu$" and insert therefor --- m$\mu$ ---; line 71 delete "$\mu$" and insert therefor --- m$\mu$ ---; line 72, delete "he" and insert therefor --- the ---. Column 4, line 2, delete "$\mu$" and insert therefor --- m$\mu$ ---; line 53, delete "To" and insert therefor --- to ---. Column 5, line 63, after "formed" and before "eight" insert therefor --- , ---. Column 6, line 19, delete "cis-αsantalol" and insert therefor --- cis-α-santalol ---; line 31, delete "dh-" and insert therefor --- dl- ---; line 33, delete "effect" and insert therefor --- affect ---; line 40, delete "lithium aluminum hydride,". Column 7, line 23, after "spectrophotometer" add --- . ---; line 70, delete "With" and insert therefor --- Watts with ---. Column 8, line 44, after "removed" and before "the" insert --- , ---; line 62, after "above" and before "and" insert --- , ---; line 72, delete "3.9x10$^3$" and insert therefor --- 3.9x10$^{-4}$ ---. Column 9, line 21, after "above" and before "and" insert --- , ---; line 41, delete "α$^{11,12}$" and insert therefor --- $\triangle^{11,12}$ ---; line 41, delete "preparation" and insert therefor --- preparative ---. Column 9, line 46, delete "n.m.n." and insert therefor --- n.m.r. ---; line 47, delete "J$_{12,14}$" and insert therefor --- J$_{13,14}$ ---. Column 10, line 17, after "ethyl" and before "$\triangle^{11,12}$-α-santalol" insert --- $\triangle^{11,12}$-α-santalates are converted to the trans and cis isomers of ---; line 19, after "borohydride" and before "aluminum" insert --- , ---. Column 12, line 9, delete "Four-" and insert therefor --- Fou- ---; line 30, after "B" and before "composition" insert --- , ---; line 34, (next page)

PO-1050
(5/69)

UNITED STATES PATENT OFFICE
CERTIFICATE OF CORRECTION

Patent No. 3,626,015     Dated December 7, 1971

Inventor(s) Ronald G. Lewis and William F. Erman    -- 2 --

It is certified that error appears in the above-identified patent and that said Letters Patent are hereby corrected as shown below:

delete "Fourgere" and insert therefor --- Fougere ---.
Column 12, line 41, in the formula delete " HC△ " and insert therefor --- HO△ ---.

Column 12, line 70, in the formula delete " 10∨9 " and insert therefor --- 10∨9 with 7 ---.

Column 14, line 22, delete "eh-" and insert therefor --- eth- ---.
Column 14, line 23, delete "tyl" and insert therefor --- yl ---.
Column 14, line 26, delete "the solvent".

Signed and sealed this 7th day of November 1972.

SEAL)
ttest:

DWARD M. FLETCHER, JR.
ttesting Officer

ROBERT GOTTSCHALK
Commissioner of Patents